US012592064B2

(12) United States Patent
Shangguan et al.

(10) Patent No.: US 12,592,064 B2
(45) Date of Patent: Mar. 31, 2026

(54) METHOD AND APPARATUS FOR TRAINING TARGET DETECTION MODEL, METHOD AND APPARATUS FOR DETECTING TARGET

(71) Applicant: BOE Technology Group Co., Ltd., Beijing (CN)

(72) Inventors: Zeyu Shangguan, Beijing (CN); Zhanfu An, Beijing (CN); Fanhao Kong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 555 days.

(21) Appl. No.: 17/915,489

(22) PCT Filed: Oct. 28, 2021

(86) PCT No.: PCT/CN2021/127188
§ 371 (c)(1),
(2) Date: Sep. 29, 2022

(87) PCT Pub. No.: WO2023/070470
PCT Pub. Date: May 4, 2023

(65) Prior Publication Data
US 2024/0242488 A1      Jul. 18, 2024

(51) Int. Cl.
*G06V 10/776*        (2022.01)
*G06V 10/25*          (2022.01)
(Continued)

(52) U.S. Cl.
CPC ............ *G06V 10/776* (2022.01); *G06V 10/25* (2022.01); *G06V 10/44* (2022.01); *G06V 10/82* (2022.01);
(Continued)

(58) Field of Classification Search
CPC ...... G06V 10/776; G06V 10/25; G06V 10/44; G06V 10/82; G06V 20/70; G06V 2201/07;
(Continued)

(56) References Cited

U.S. PATENT DOCUMENTS

2021/0271934 A1      9/2021   White et al.
2022/0309779 A1 *   9/2022   Wang ................... G06V 10/766

FOREIGN PATENT DOCUMENTS

CN          110569699 A  * 12/2019   ......... G06K 9/00718
CN          110569703 A  * 12/2019   ......... G01N 21/8851
(Continued)

OTHER PUBLICATIONS

Sixian Chan et al., "Rotating Object Detection in Remote-Sensing Environment", Research Square, Aug. 24, 2021, total 11 pages.
(Continued)

*Primary Examiner* — Chineyere Wills-Burns
*Assistant Examiner* — Phuong Hau Cai
(74) *Attorney, Agent, or Firm* — XSENSUS LLP

(57) ABSTRACT

Provided is a method for training a target detection model. The method includes: determining a first region in a sample image; counting training periods of the target detection model, and determining a relationship between an intersection region and the first region in response to a number of training periods of the target detection model reaching a target number; determining, in response to the relationship between the intersection region and the first region satisfying a target relationship, a predetermined low loss function value as a loss function value of the first region; and training the target detection model with reference to the loss function value, wherein the target detection model is used to detect one or more of fireworks, dust, clouds, shorelines, flame, smoke, steam, or night light in an image.

12 Claims, 6 Drawing Sheets

(51) Int. Cl.
    *G06V 10/44*     (2022.01)
    *G06V 10/82*     (2022.01)
    *G06V 20/70*     (2022.01)

(52) U.S. Cl.
    CPC .......... *G06V 20/70* (2022.01); *G06V 2201/07*
                            (2022.01)

(58) Field of Classification Search
    CPC ... G06V 10/774; G06V 2201/03; G06F 18/00
    See application file for complete search history.

(56) References Cited

FOREIGN PATENT DOCUMENTS

| | | | |
|---|---|---|---|
| CN | 110675407 | A | 1/2020 |
| CN | 111709416 | A | 9/2020 |
| CN | 112329873 | A | 2/2021 |
| CN | 112819804 | A | 5/2021 |
| CN | 113011319 | A | 6/2021 |
| CN | 113469025 | A | 10/2021 |

OTHER PUBLICATIONS

China National Intellectual Property Administration, First office action of Chinese application No. 202180003132.8 issued on Nov. 28, 2025, which is foreign counterpart application of this US application, 16 pages.
Qiang Zhang et al.(editors), "High-Resolution Remote Sensing Image Processing and Application Based on Deep Neural Network Technology" —Version 1, China Aerospace Publishing House, Aug. 31, 2020, pp. 141-142 (14 pages).

\* cited by examiner

300

First determining module          301

Second determining module          302

Processing module          303

Training module          304

Counting module          305

400

Memory          401

Processor          402

Display assembly          403

METHOD AND APPARATUS FOR TRAINING TARGET DETECTION MODEL, METHOD AND APPARATUS FOR DETECTING TARGET

CROSS-REFERENCE TO RELATED APPLICATION

This application is a U.S. national stage of international application No. PCT/CN2021/127188, filed on Oct. 28, 2021, the disclosure of which is incorporated herein by reference in their its entirety.

TECHNICAL FIELD

The present disclosure relates to the field of image detection, and in particular, relates to a method and apparatus for training a target detection model, and a method and apparatus for detecting a target.

BACKGROUND

A target detection is to identify a target of interest in an image or a video, for example, people, animals, flames, smoke. Generally, the target of interest in the image or the video are detected and identified by a target detection model.

SUMMARY

Embodiments of the present disclosure provide a method and apparatus for training a target detection model, and a method and apparatus for detecting a target. The technical solutions are as follows.

According to some embodiments of the present disclosure, a method for training a target detection model is provided. The method includes:

determining a first region in a sample image, wherein the first region is a target region predicted by the target detection model in the sample image;

determining a relationship between an intersection region and the first region, wherein the intersection region is an intersection of the first region and a second region, wherein the second region is a region annotated for a target in the sample image in a data annotation phase, and surrounds the target in the sample image;

determining, in response to the relationship between the intersection region and the first region satisfying a target relationship, a predetermined low loss function value as a loss function value of the first region, wherein the predetermined low loss function value is a constant; and training the target detection model with reference to the loss function value.

In some embodiments, determining the relationship between the intersection region and the first region includes:

calculating a ratio of an area of the intersection region to an area of the first region;

and the relationship between the intersection region and the first region satisfying the target relationship includes:

the ratio of the area of the intersection region to the area of the first region being not less than a threshold.

In some embodiments, the threshold ranges from 0.9 to 1.

In some embodiments, the low loss function value is less than 0.001.

In some embodiments, the sample image includes one or more types of targets, and each of the one or more types of targets corresponds to at least one first region; and training the target detection model with reference to the loss function value includes:

performing a weighted summation on loss function values of a plurality of first regions corresponding to the one or more types of targets; and training the target detection model with reference to a loss function value acquired by performing the weighted summation.

In some embodiments, in performing the weighted summation on the loss function values of the plurality of first regions corresponding to one or more types of targets, a weight of the low loss function value is greater than weights of other loss function values.

In some embodiments, first regions of different targets have different identifications, and second regions of different targets have different identifications;

the first region and the second region of a same target have a same identification.

In some embodiments, the method further includes:

counting training periods of the target detection model; and performing, in response to a number of training periods of the target detection model reaching to a target number, steps of determining the relationship between the intersection region and the first region, and determining, in response to the relationship between the intersection region and the first region satisfying the target relationship, the predetermined low loss function value as the loss function value of the first region.

In some embodiments, the method further includes:

determining, in response to the relationship between the intersection region and the first region not satisfying the target relationship, the loss function value of the first region using a loss function value calculation formula.

According to some embodiments of the present disclosure, a method for detecting a target is provided. The method includes:

detecting the target using a target detection model, wherein the target detection model is trained by the method according to any of above embodiments.

According to some embodiments of the present disclosure, an apparatus for training a target detection model is provided. The apparatus includes:

a first determining module, configured to determine a first region in a sample image, wherein the first region is a target region predicted by the target detection model in the sample image;

a second determining module, configured to determine a relationship between an intersection region and the first region, wherein the intersection region is an intersection of the first region and a second region, wherein the second region is a region annotated for a target in the sample image in a data annotation phase, and surrounds the target in the sample image;

a processing module, configured to determine, in response to the relationship between the intersection region and the first region satisfying a target relationship, a predetermined low loss function value as a loss function value of the first region, wherein the predetermined low loss function value is a constant; and a training module, configured to train the target detection model with reference to the loss function value.

In some embodiments, the second determining module is configured to calculate a ratio of an area of the intersection region to an area of the first region;

the relationship between the intersection region and the first region satisfying the target relationship includes:

the ratio of the areas being not less than a threshold.

In some embodiments, the threshold ranges from 0.9 to 1.

In some embodiments, the low loss function value is less than 0.001.

In some embodiments, the sample image includes one or more types of targets, and each of the one or more types of targets corresponds to at least one first region; and the training module is configured to perform a weighted summation on loss function values of a plurality of first regions corresponding to the one or more types of targets; and train the model with reference to a loss function value acquired by performing the weighted summation.

According to some embodiments of the present disclosure, an apparatus for detecting a target is provided. The apparatus includes:

a detecting module, configured to detect the target using a target detection model, wherein the target detection model is trained by the method according to any of above embodiments.

According to some embodiments of the present disclosure, a computer device is provided. The computer device includes: a processor and a memory; wherein the memory is configured to store a computer program; and the processor, when executing the computer program stored in the memory, is caused to perform the method for training the target detection model according to any of above embodiments, or the method for detecting the target according to any of above embodiments.

According to some embodiments of the present disclosure, a computer-readable storage medium is provided. The computer-readable storage medium stores a computer instruction, wherein the stored computer instruction, when executed by a processor, causes the processor to perform the method for training the target detection model according to any of above embodiments, or the method for detecting the target according to any of above embodiments.

BRIEF DESCRIPTION OF THE DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION

To make the objectives, technical solutions, and advantages of the present disclosure clearer, the embodiments of the present disclosure are further described in detail hereinafter with reference to the accompanying drawings.

In the case that the entire target is similar to a prat of the target (for example, outline, outline, and the like), and the target is infinitely divided, the target has a self-similarity, for example, the flame has the self-similarity.

In detecting the target with the self-similarity, the detection is determined to be inaccurate in the case that a region of the target annotated by the target detection model is different from a pre-annotated annotation region.

Currently, in the field of target detection based on deep learning, targeted annotation standards and detection means have not been proposed for the detection of the target with the self-similarity (for example, fireworks, dust, clouds, shorelines, and the like). The detection is just taken as a general target detection, that is, the samples are infinitely added, and the cumbersome and manual annotation is performed.

Figures 1, 2, 3:
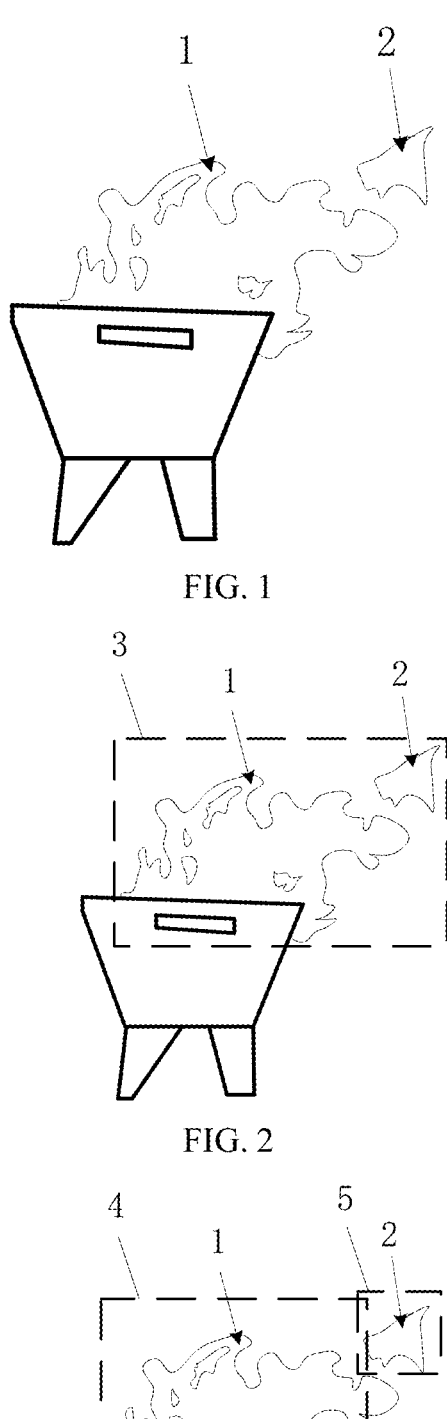
FIG. 1 is a schematic diagram of combustion in a furnace according to some embodiments of the present disclosure.
FIG. 2 is a schematic diagram of combustion in a furnace according to some embodiments of the present disclosure.
FIG. 3 is a schematic diagram of combustion in a furnace according to some embodiments of the present disclosure.

For the detection of the target with the self-similarity, the self-similarity of the target itself affects the precision of data annotation and model identification. Taking the detection of the flame as an example, the flame has the self-similarity, that is, the entire flame is similar to a prat of the flame. FIG. 1 is a schematic diagram of combustion in a furnace. As shown in FIG. 1, two parts of the flame is numbered as reference numeral 1 and reference numeral 2, and the two parts of the flame are similar to the entire flame. Thus, ambiguity is generated in annotating data. Some of people annotate the entire flame, such as reference numeral 3 in FIG. 2, and others regard that it is necessary to annotate a tongue of flame in a periphery region and a flame body, such as reference numeral 4 and reference numeral 5 in FIG. 3. In this case, in the data annotation phase, different people have different judgments on flame regions, that is, ambiguity is generated in annotating data, which causes difficult model convergence and less precision of detecting the type of objects. In training the model, as the flame has the self-similarity, regions annotated by the model at different scales are merely a part of the flame in the original (a fractal). That is, the annotated regions are different from the entire region of the target. In other way, the acquired loss function value is greater, but the detection of the model in this case is actually correct. That is, any detected part of the flame is the flame itself, and it is not limited to the absolutely entire shape of the flame.

In summary, in detecting the target with the self-similarity, the detection is determined to be inaccurate in the case that a region of the target annotated by the target detection model is different from a pre-annotated annotation region. However, the region of the target annotated by the target detection model is a part of the target, and the target is actually detected. In the case that the detection is determined to be inaccurate, and parameters of the target detection model are updated, the identifying precision of the model is caused to be less. That is, in detecting the target with the self-similarity, a problem of difficult annotation and inaccurate detection exists.

Figure 4:
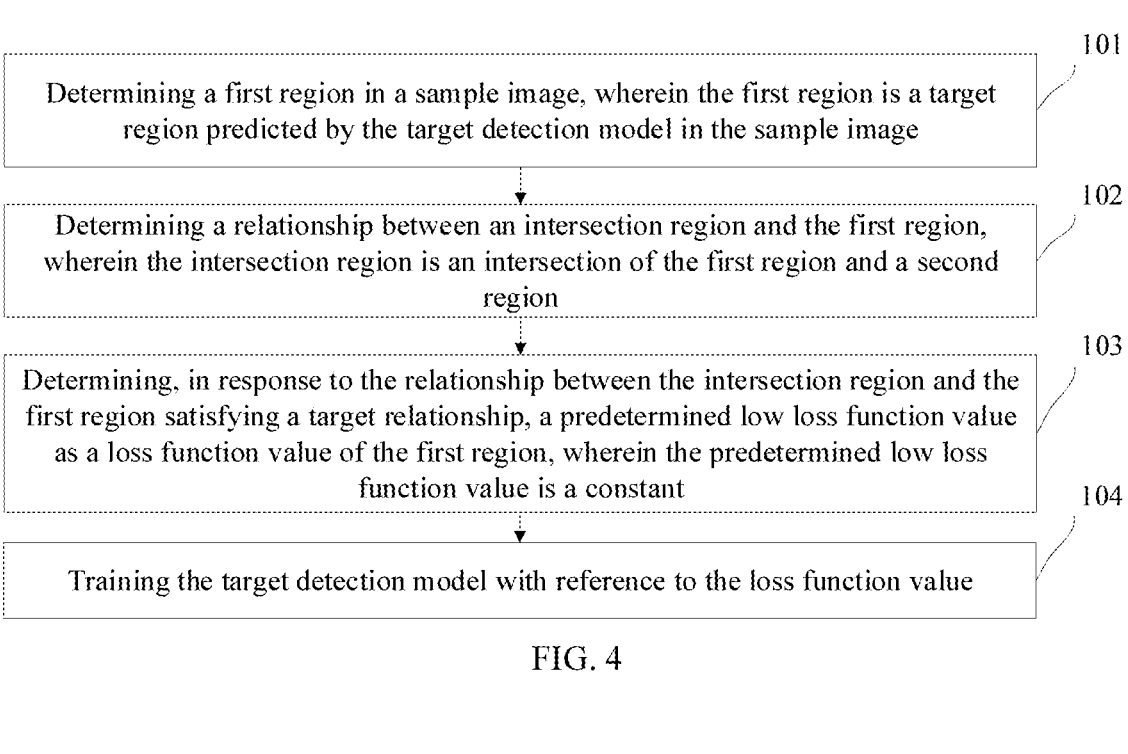
FIG. 4 is a flowchart of a method for training a target detection model according to some embodiments of the present disclosure.

FIG. 4 is a flowchart of a method for training a target detection model according to some embodiments of the present disclosure. Referring to FIG. 4, the method includes the following steps.

In 101, a first region in a sample image is determined, wherein the first region is a target region predicted by the target detection model in the sample image.

The target detection model is a neural network model configured to identify the target in the image. The sample image is an image used in training the target detection model. The first region is a region of the target annotated by the target detection model in detecting the target in the image in training phase, that is, the target region.

In 102, a relationship between an intersection region and the first region is determined, wherein the intersection region is an intersection of the first region and a second region.

The second region is a region annotated for a target in the sample image in a data annotation phase, and surrounds the target in the sample image.

Generally, in the field of target detection, the target is annotated and marked by a rectangular box. As the data annotation phase is performed manually, the second region is also referred to as a real box. As the first region is predicted by the target detection model, the first region is also referred to as a prediction box.

In 103, a predetermined low loss function value is determined, in response to the relationship between the intersection region and the first region satisfying a target relationship, as a loss function value of the first region, wherein the predetermined low loss function value is a constant.

The predetermined low loss function value is set prior to training, and a value of the low loss function value is less, such as 0.001.

In the embodiments of the present disclosure, in the case that the relationship between the intersection region and the first region satisfies the target relationship, most of the first region, even entire first region, falls within the second region. The loss function value of the first region is suppressed to control the loss function value to be a less value, such as a value less than a predetermined value.

In this step, the loss function value of the first region is a less value or a greater value when calculated using a loss function value formula. However, in the case that the relationship between the intersection region and the first region satisfies the target relationship, the loss function value of the first region is represented by a less value no matter whether the loss function value calculated using the loss function value formula is a greater value or a less value, so as to achieve a purpose of suppressing the loss function value.

In 104, the target detection model is trained with reference to the loss function value.

That is, a parameter of the target detection model is updated with reference to the suppressed loss function value, and a next period of training is performed.

In annotating the model, a case of the annotated region being merely a part of the target exists, and the case is accurate. In the training method in the embodiments of the present disclosure, as the annotated second region belongs to the region of the target, the annotated first region is the target in the case that the relationship of the intersection region of the first region and the second region and the first region satisfies the target relationship. In this case, the predetermined low loss function value is determined as the loss function value of the first region, and the loss function value is suppressed, such that a correct annotation is determined in the case that the model merely annotates a part of the target. Thus, an incorrect update of the parameter of the model is avoided, and the identifying precision of the model is greater.

Figure 5:
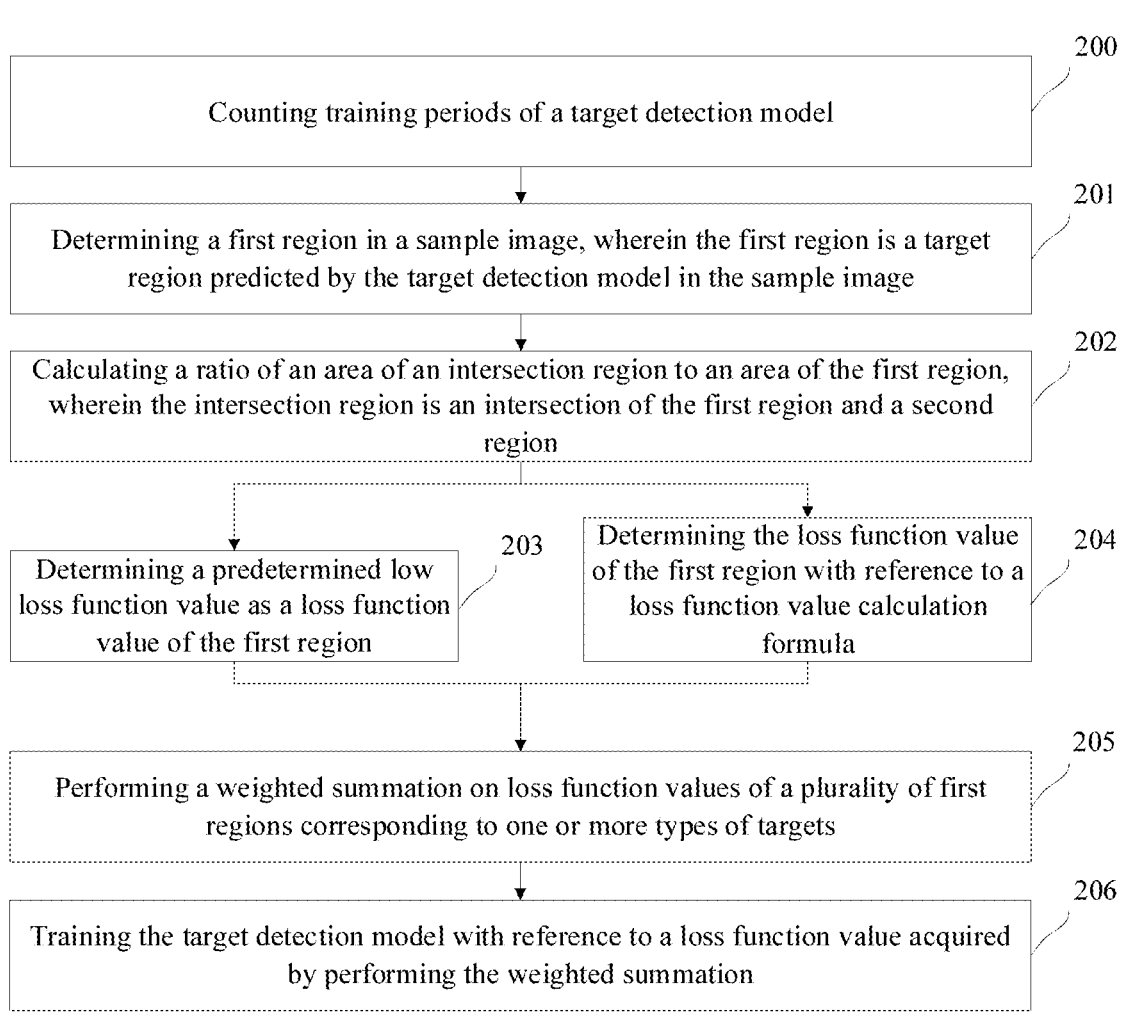
FIG. 5 is a flowchart of a method for training a target detection model according to some embodiments of the present disclosure.

FIG. 5 is a flowchart of a method for training a target detection model according to some embodiments of the present disclosure. Referring to FIG. 5, the method includes the following steps.

In 200, training periods of the target detection model is counted.

In the case that a number of training periods reaches to a target number, S201 and subsequent steps are performed. Otherwise, the target detection model is trained in a conventional training process.

The target detection model operates periodically, and the target detection is performed on the input sample image in each period. The loss function value is determined based on the first region annotated in detecting and the pre-annotated second region, the parameter of the target detection model is updated with reference to the loss function value, and a next period of training is performed.

In some embodiments, a total period of training the target detection model is A, and the target value is A/2.

In some embodiments, the total period of training the target detection model is 300, and the conventional training process is performed in top 150 periods, that is, the training process of suppressing the loss function value is not performed. In the case that the number of training periods reaches to 150, S201 and subsequent steps are performed, that is, the process of suppressing the loss function value is performed.

In the embodiments of the present disclosure, the loss function value is suppressed after the training is performed for some duration and the precision of detecting the model is ensured, such that the effect of improving the model property by suppressing the loss function value is ensured.

Taking the detection of the flame as an example, a time node of starting the training process of suppressing the loss function value is set. That is, in the case that the training of the target detection model is performed for some duration, the target detection model has learned the shape of the flame to some extent. In this case, the training process of suppressing the loss function value is performed, the active suppression of the loss function value is performed on the first region entirely surrounded by the second region, such that the confidence of the model in detecting the fractal of the flame target is enhanced, the perception for the self-similarity of the target is enhanced, and the greater model property is achieved.

In 201, a first region in a sample image is determined, wherein the first region is a target region predicted by the target detection model in the sample image.

Generally, in the field of target detection, the target is marked and annotated by a rectangular box. As the data annotation phase is performed manually, the second region is also referred to as a real box. As the first region is predicted by the target detection model, the first region is also referred to as a prediction box.

In 202, a ratio of an area of the intersection region to an area of the first region is calculated, wherein the intersection region is an intersection of the first region and a second region.

The second region is a region annotated for the target in the sample image in a data annotation phase, and surrounds the target in the sample image.

The second region is the rectangular box, and the rectangular box is an outer rectangle of the target, such as, a maximum outer rectangle.

In the embodiments of the present disclosure, in annotating the target on the sample image, the annotating process is performed by annotating a maximum surrounding box (for example, the maximum outer rectangle of the target) of the target from a same source. The same source indicates the same target, and distances between the parts are not greater than a distance threshold, such as, 30% of a width of the image.

Figure 6:
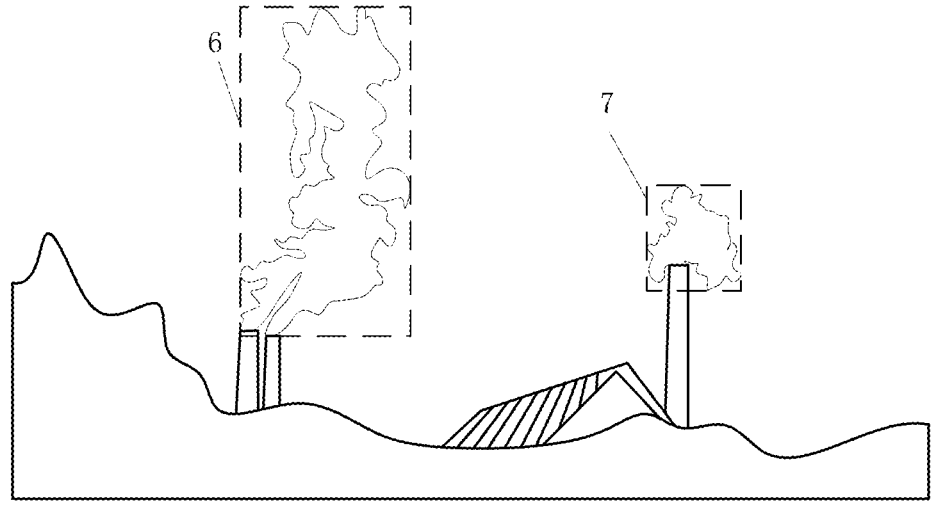
FIG. 6 is a schematic diagram of smoke according to some embodiments of the present disclosure.

As shown in FIG. 6, although the two annotated parts are all smoke, the distance between the two smoke is greater, and thus the two smoke are not from the same source. Thus, the two smoke need to be annotated by separated rectangular boxes, that is, reference numeral 6 and reference numeral 7 in FIG. 6. In the case that the targets are from the same source, the target is annotated as one rectangular box, for example, reference numeral 3 in FIG. 2.

In the embodiments of the present disclosure, by annotating the maximum and outermost outline of the target but the fractal of the target, whether the first region is accurate is sequentially determined based on the intersection region of the first region and the second region.

In some embodiments, the ratio of the areas in S202 is calculated using the following formula:

$$\frac{\text{intersection } (pred, gt)}{\text{area}(pred)}. \tag{1}$$

pred represents the first region, gt represents the second region, intersection(pred, gt) represents the area of the intersection region, and area(pred) represents the area of the first region.

In the embodiments of the present disclosure, the areas of the first region and the second region are calculated by identifying a length and width of the rectangular box in the sample box. The area of the intersection region is calculated by identifying a length and width of the intersection region in the sample box.

In the case that the ratio of the area of the intersection region to the area of the first region is not less than a threshold, the annotation of the first region is accurate. In this case, S203 is performed. In the case that the ratio of the area of the intersection region to the area of the first region is not greater than a threshold, the annotation of the first region is inaccurate. In this case, S204 is performed.

In some embodiments, the threshold ranges from 0.9 to 1. As the threshold is great enough, the loss function value is suppressed only in the case that the annotation is for the target, such that the parameter of the model is updated with reference to the loss function value in the case that the annotation is inaccurate, and the precision of the model is improved.

In some embodiments, the threshold is 0.998.

In S203, a predetermined low loss function value is determined as a loss function value of the first region.

In the case that the ratio is greater than the threshold, the precision of annotating the first region is great. In this case, the suppression the loss function value improves the precision of the model.

In this step, the suppressed loss function value is set to a value small enough, such that a greatly change of the parameter of the model is avoided in the case that the model is annotated correctly.

In some embodiments, the low loss function value is a constant less than 0.001.

In some embodiments, the low loss function value is 0.0001.

In 204, the loss function value of the first region is determined using a loss function value calculation formula.

For the first region not satisfying the target relationship, the conventional loss function value calculation formula is used to calculate, so as to ensure normal operation of training the model.

In some embodiments, the loss function value calculation formula is as follows:

$$L_{CIOU} = 1 - IOU + \frac{\rho^2(b, b^{gt})}{c^2} + \alpha v. \tag{2}$$

$L_{CIOU}$ represents the loss function value, IOU represents an intersection over union between the first region and the second region, $\alpha v$ represents an impact factor, a is a parameter for weighting, v is a parameter for measuring consistency of the length and width of the rectangular box; Bgt represents a prediction box of the a defect, B represents a prediction box with type of an insulator, and b and bgt respectively represents center points of B and Bgt; $\rho$ represents an Euclidean distance; c represents a diagonal distance of a minimum outer rectangle of the target.

IOU is calculated using following formula:

$$IOU = \frac{\text{intersection}(pred, gt)}{\text{union}(pred, gt)}. \tag{3}$$

union(pred, gt) represents a union region of the first region and the second region.

S203 and S204 are represent using following formula:

$$L_{CIOU} = \begin{cases} 1 - IOU + \frac{\rho^2(b, b^{gt})}{c^2} + \alpha v, & \frac{\text{intersection}(pred, gt)}{\text{area}(pred)} > 0.998. \\ 0.0001 \end{cases} \tag{4}$$

In 205, a weighted summation is performed on loss function values of a plurality of first regions corresponding to the one or more types of targets.

The target image includes one or more types of targets, and each of the one or more types of targets corresponds to at least one first region.

In this step, the loss function value of the entire sample image is acquired in a weighted means, such that a weight of the first region is set based on whether the loss function value is suppressed, the suppression of the loss function value of the first region is further facilitated, and the identifying precision of the model is improved.

In some embodiments, S205 is calculated using following formula:

$$L_{box} = \frac{\sum \sum M \odot L_{CIOU}}{\sum \sum M}. \tag{5}$$

Figure 7:
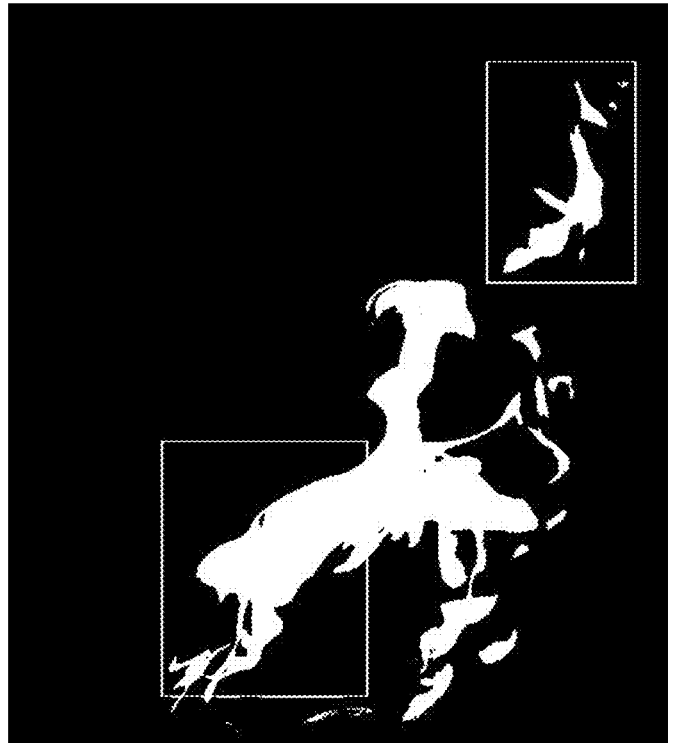
FIG. 7 is a schematic diagram of combustion according to some embodiments of the present disclosure.

M represents a weight matrix of the same size of $L_{CIOU}$, $L_{box}$ represents the loss function value of each sample image. Both a numerator and denominator in formula (5) have two summation symbols, and the first of the two summation symbols represents a summation of the loss function values of the first regions in one target. FIG. 7 is a schematic diagram of annotation of combustion. Referring to FIG. 7, the model annotates two first regions for the flame, that is, two little rectangular boxes in the drawing. In calculating, the loss function values of the two little rectangular boxes are determined and summed to acquire the loss function value of the target of the flame. The second of the two summation symbols represents a summation of the loss function values of the targets in the sample image.

In some embodiments, in performing the weighted summation on the loss function values of the plurality of first regions corresponding to the one or more types of targets, a weight of the low loss function value (determined in S203) is greater than a weight of other loss function value (determined in S204). By improving the weight of the suppressed loss function value, the greatly change of the parameter of the model is avoided in the case that the model is annotated correctly.

For example, in performing the weighted summation, there are a first loss function value and a second loss function value. The first loss function value is the low loss function value, and the second loss function value is calculated using the loss function value calculation formula. In performing the weighted summation, a weight of the first loss function value is greater than a weight of the second loss function value, for example, the weight of the first loss function value is twice of the weight of the second loss function value.

In some embodiments, the first regions of different targets have different identifications, the second regions of different targets have different identifications, and the first region and the second region of a same target have a same identification. For one sample image, detections of a plurality of targets are performed simultaneously, the first regions (or the second regions) of different targets are distinguished by different identifications, the first region and the second region of the same target are associated by the identification, so as to ensure simultaneously training of the target detection.

In 206, the target detection model is trained with reference to a loss function value acquired by performing the weighted summation.

Taking a target detection model achieved by a YoloV5-s network as an example, the effect of the method for training the model in the embodiments of the present disclosure is compared with the effect of the method for training the model in other way. In the comparison tests, the flame includes conflagration and candle.

Figure 8:
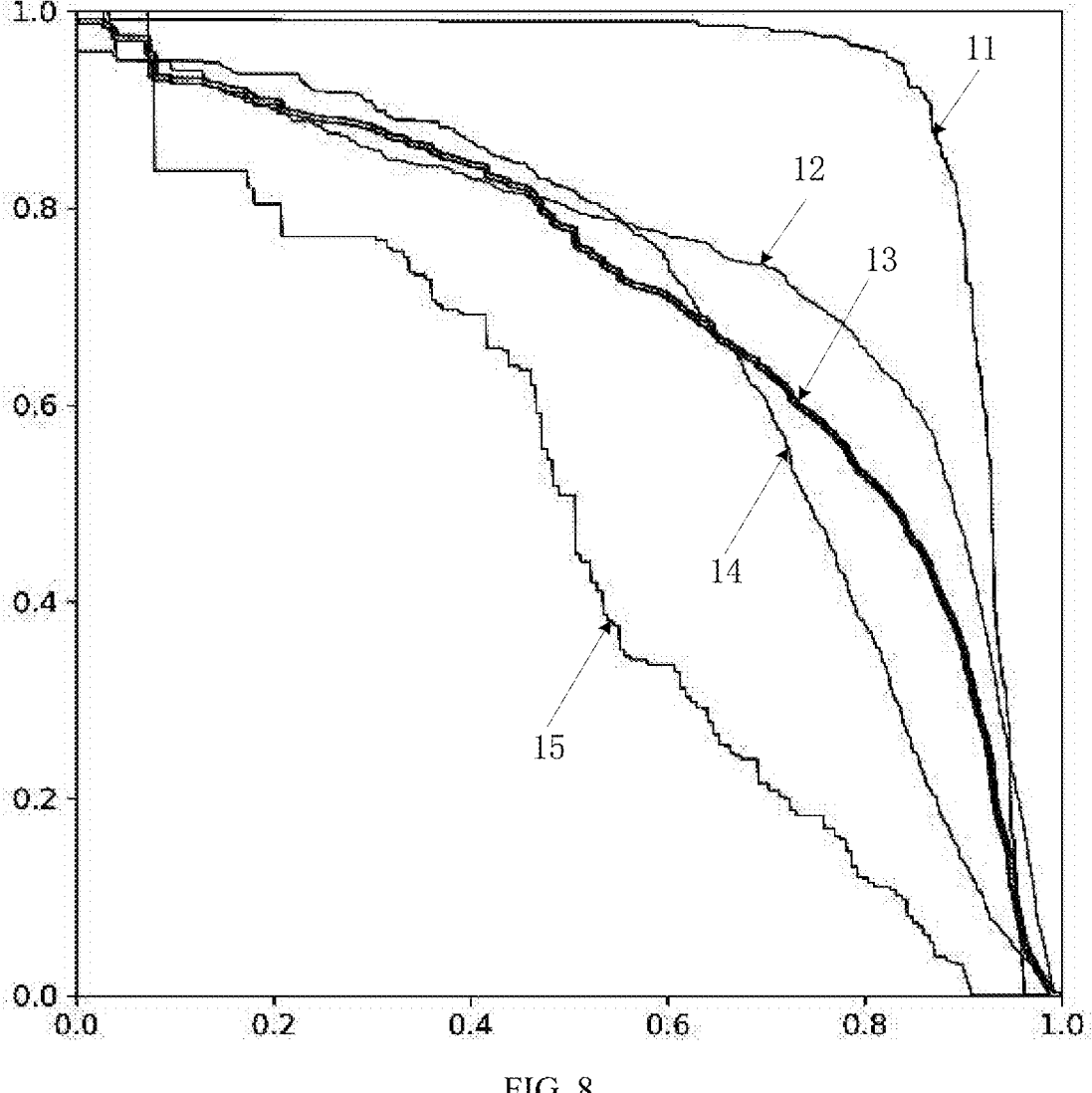
FIG. 8 is a schematic diagram of an effect of detecting a target according to a method provided by some embodiments of the present disclosure.
Figure 9:
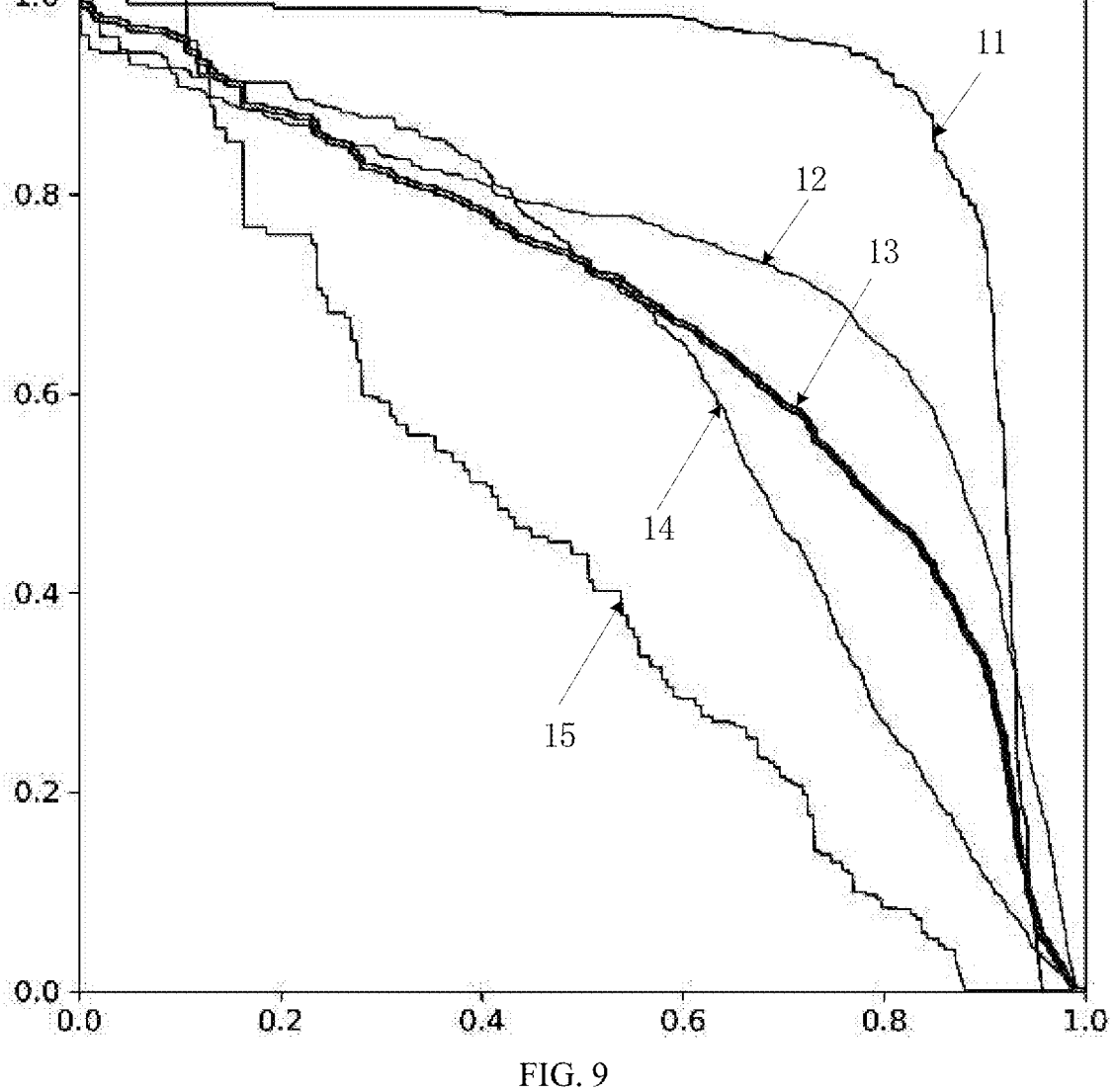
FIG. 9 is a schematic diagram of an effect of detecting a target according to other practices.

FIG. 8 is a schematic diagram of an effect of detecting a target according to a method provided by some embodiments of the present disclosure. Referring to FIG. 8, reference numerals 11 to 15 represent candle, conflagration, all types, smoke. PR curve disturbed with the night light. R in the PR curve is an abscissa, that is, a recall. P in the PR curve is an ordinate, that is, a precision. The recall is a ratio of the number of targets identified from the picture to the number of annotated targets, and the precision is a correction rate of identified targets. FIG. 9 is a schematic diagram of an effect of detecting a target according to other practices.

In FIG. 8, the precision of the conflagration, smoke, and candle are 0.747, 0.682, and 0.482 in the case that the recall is 0.5, and the precision of the all types is 0.704. In FIG. 9, the precision of the conflagration, smoke, and candle are 0.729, 0.625, and 0.437 in the case that the recall is 0.5, and the precision of the all types is 0.670.

Referring to FIG. 8 and FIG. 9, comparing with the model trained using the method provided in some embodiments of the present disclosure and the model trained using the method in other way, the detection precision of the conflagration, smoke, and candle are improved by 2.47%. 9.12%, and 2.02%, and fluctuations of curves of the precision and recall are obvious reduced, such that the effectiveness of the training method in the embodiments of the present disclosure is verified.

Although above embodiments of the present disclosure are described by taking the detection of the flame as an example, the training method is applicable to detecting the target with self-similarity statistical characterization, for example, dust, clouds, steam, shorelines, and the like. In addition, although the present disclosure is tested by taking the YoloV5-s network as an example, the training method is applicable to training the model based on other network.

In the present disclosure, a currently inflexible method of stacking data, increasing samples, or overfitting process scenes in detecting the target with the self-similarity is improved. As only the largest and outermost outline is annotated, the workload of data annotation and preparation is reduced, the detection result is improved, and the problem of difficult annotation and inaccurate detection in detecting the target with the self-similarity is improved. The detection precision of the model for the objects with the self-similarity is improved by the forced suppression of the low loss function value generated in detecting the fractal of the object in training process.

The embodiments of the present disclosure provide a method for detecting a target. The method includes: detecting the target using a target detection model. The target detection model is trained by the method shown in FIG. 4 or FIG. 5.

Figure 10:
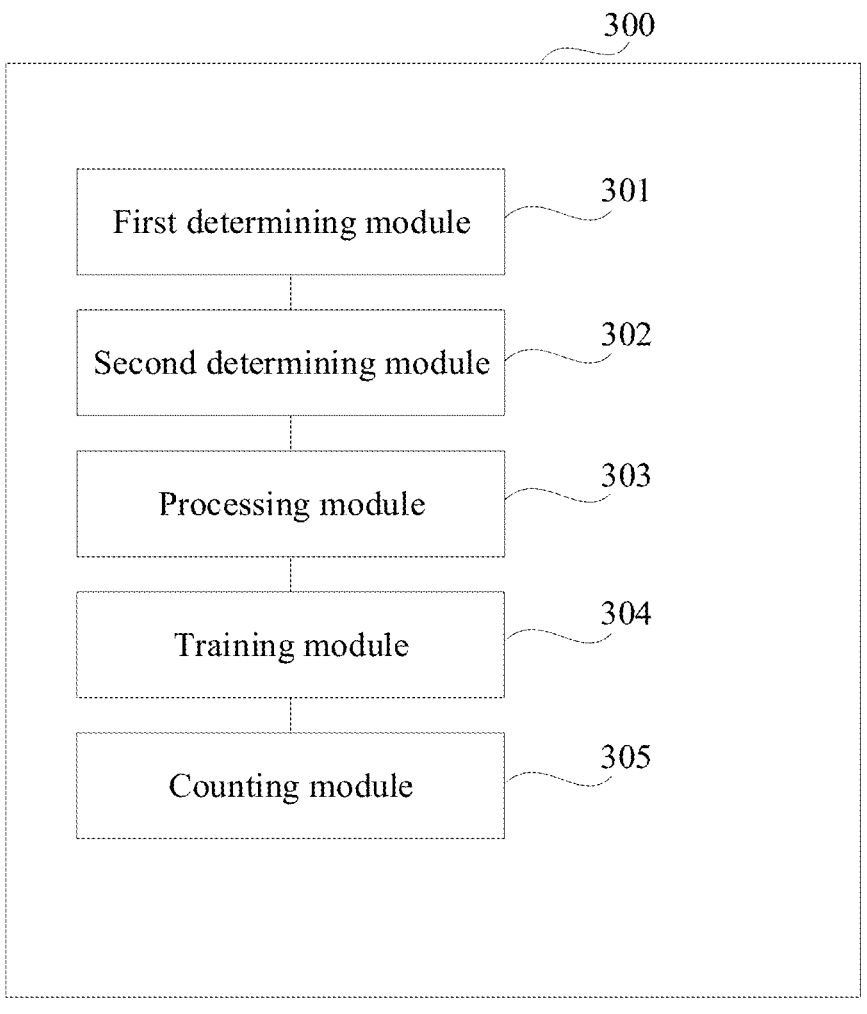
FIG. 10 is a block diagram of an apparatus for training a target detection model according to some embodiments of the present disclosure.

FIG. 10 is a block diagram of an apparatus 300 for training a target detection model according to some embodiments of the present disclosure. As shown in FIG. 10, the apparatus 300 for training the target detection model includes: a first determining module 301, a second determining module 302, a processing module 303, and a training module 304.

The first determining module 301 is configured to determine a first region in a sample image, wherein the first region is a target region predicted by the target detection model in the sample image.

The second determining module 302 is configured to determine a relationship between an intersection region and the first region, wherein the intersection region is an intersection of the first region and a second region, wherein the second region is a region annotated for a target in the sample image in a data annotation phase, and surrounds the target in the sample image.

The processing module 303 is configured to determine, in response to the relationship between the intersection region and the first region satisfying a target relationship, a predetermined low loss function value as a loss function value of the first region, wherein the predetermined low loss function value is a constant.

The training module 304 is configured to train the target detection model with reference to the loss function value.

In some embodiments, the second determining module 302 is configured to calculate a ratio of an area of the intersection region to an area of the first region;

the relationship between the intersection region and the first region satisfying the target relationship includes:

the ratio of the areas being not less than a threshold.

In some embodiments, the threshold ranges from 0.9 to 1.

In some embodiments, the low loss function value is less than 0.001.

In some embodiments, the sample image includes one or more types of targets, and each of the one or more types of targets corresponds to at least one first region; and the training module 304 is configured to perform a weighted summation on loss function values of a plurality of first regions corresponding to the one or more types of targets; and train the target detection model with reference to a loss function value acquired by performing the weighted summation.

In some embodiments, in performing the weighted summation on the loss function values of the plurality of first regions corresponding to the one or more types of targets, a weight of the low loss function value is greater than weights of other loss function values.

In some embodiments, first regions of different targets have different identifications, and second regions of different targets have different identifications;

the first region and the second region of a same target have a same identification.

In some embodiments, the processing module 303 is configured to determine, in response to the relationship between the intersection region and the first region not satisfying the target relationship, the loss function value of the first region using a loss function value calculation formula.

In some embodiments, the apparatus further includes:

a counting module 305, configured to count training periods of the target detection model; and the second determining module 302 and the processing module 303 are configured to determine, in response to a number of training periods of the target detection model reaching to a target number, the relationship between the intersection region and the first region, and determine, in response to the relationship between the intersection region and the first region satisfying the target relationship, the predetermined low loss function value as the loss function value of the first region.

It should be noted that, when the apparatus for training the target detection model in the above embodiments performs the training of the target detection model, division of the above functional modules is merely used as an example. In actual applications, the foregoing functions can be achieved by different functional modules as required. That is, the internal structure of the apparatus is divided into different functional modules to achieve all or part of the functions described above. In addition, the apparatus for training the target detection model in the above embodiments and the method for training the target detection model in the above embodiments belong to the same concept, and the specific implementation process is detailed in the method embodiments, which are not repeated herein.

The embodiments of the present disclosure provide an apparatus for detecting a target. The apparatus includes: a detecting module. The detecting module is configured to detect the target using a target detection model, and the target detection model is trained by the method shown in FIG. 4 or FIG. 5.

Figure 11:
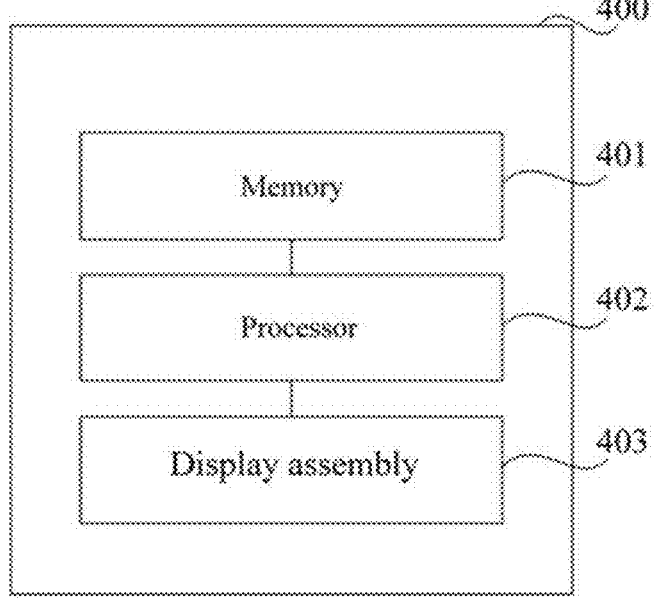
FIG. 11 is a schematic structural diagram of a computer device according to some embodiments of the present disclosure.

As shown in FIG. 11, the embodiments of the present disclosure further provide a computer device 400. The computer device 400 is an apparatus for training a target detection model, or other target detection devices. The computer device 400 is configured to perform the method for training the target detection model in the above embodiments. Referring to FIG. 11, the computer device 400 includes a memory 401, a processor 402, and a display assembly 403. It should be understood for those skilled in the art that the structure of the computer device 400 shown in FIG. 11 does not constitute a limitation to the computer device 400, and includes more or less components than those illustrated, or combines some components or adopts different component arrangements in practical applications.

The memory 401 is configured to store a computer program and a module, and mainly includes a program storage region and a data storage area. The program storage region stores an operating system, an application required by at least one function, and the like. The memory 401 includes a high-speed random-access memory, and further includes a non-volatile memory, such as at least one magnetic disk storage device, a flash memory device, or other non-volatile solid-state storage devices. Correspondingly, the memory 401 further includes a memory controller configured to provide the processor 402 with access to the memory 401.

The processor 402 performs various functional applications and data processing by running software programs and modules stored in the memory 401.

The display assembly 403 is configured to display images. The display assembly 403 includes a display panel. In some embodiments, the display panel is configured in a form of a liquid crystal display (LCD), an organic light-emitting diode (OLED), and the like.

In some exemplary embodiments, a computer-readable storage medium is further provided, which is a non-transitory computer-readable storage medium. The computer-readable storage medium stores a computer program therein. The computer program in the computer-readable storage medium, when executed by a processor, causes the processor to perform the method for training the target detection model, or the method for detecting the target according to the embodiments of the present disclosure.

In the exemplary embodiments, a computer program product is further provided. The computer program product stores instructions. The instructions, when executed by a computer, causes the computer to perform the method for training the target detection model, or the method for detecting the target according to the embodiments of the present disclosure.

In the exemplary embodiments, a chip is further provided. The chip includes a programmable logic circuit and/or program instruction. The chip performs the method for training the target detection model, or the method for detecting the target according to the embodiments of the present disclosure when running.

It may be understood by a person of ordinary skill in the art that all or part of steps in the above embodiments may be performed by hardware, or by relevant hardware instructed by a program. The program is stored in a computer-readable storage medium which is a read-only memory, a magnetic disk, an optical disc, or the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A method for training a target detection model, comprising:

determining a first region in a sample image, wherein the first region is a target region predicted by the target detection model in the sample image, and the sample image comprises one or more of fireworks, dust, clouds, shorelines, flame, smoke, steam, or night light;

counting training periods of the target detection model and determining a relationship between an intersection region and the first region in response to a number of training periods of the target detection model reaching a target number, wherein the intersection region is an intersection of the first region and a second region, wherein the second region is a region annotated for a target in the sample image in a data annotation phase, and surrounds the target in the sample image;

determining, in response to the relationship between the intersection region and the first region satisfying a target relationship, a predetermined low loss function value as a loss function value of the first region, wherein the predetermined low loss function value is a constant and is less than 0.001; and training the target detection model with reference to the loss function value; wherein the target detection model is used to detect one or more of fireworks, dust, clouds, shorelines, flame, smoke, steam, or night light in an image;

wherein determining the relationship between the intersection region and the first region comprises: calculating a ratio of an area of the intersection region to an area of the first region;

the relationship between the intersection region and the first region satisfying the target relationship comprises: the ratio of the area of the intersection region to the area of the first region being not less than a threshold, the threshold ranging from 0.9 to 1; and training the target detection model with reference to the loss function value comprises: updating a parameter of the target detection model with reference to the loss function value that is suppressed, and performing a next period of training.

2. The method according to claim 1, wherein the sample image comprises one or more types of targets, and each of the one or more types of targets corresponds to at least one first region; and training the target detection model with reference to the loss function value comprises:

performing a weighted summation on loss function values of a plurality of first regions corresponding to the one or more types of targets; and training the target detection model with reference to a loss function value acquired by performing the weighted summation.

3. The method according to claim 2, wherein in performing the weighted summation on the loss function values of the plurality of first regions corresponding to the one or more types of targets, a weight of the low loss function value is greater than weights of other loss function values.

4. The method according to claim 1, further comprising:

determining, in response to the relationship between the intersection region and the first region not satisfying the target relationship, the loss function value of the first region using a loss function value calculation formula.

5. A method for detecting a target, comprising:

detecting the target using a target detection model, wherein the target detection model is trained by the method as defined in claim 1.

6. A non-transitory computer-readable storage medium, storing a computer instruction therein, wherein the stored computer instruction, when executed by a processor, causes the processor to perform the method for detecting the target as defined in claim 5.

7. A computer device, comprising: a processor and a memory; wherein the memory is configured to store a computer program; and the processor, when running the computer program stored in the memory, is caused to perform the method for detecting the target as defined in claim 5.

8. A computer device, comprising: a processor and a memory; wherein the memory is configured to store a computer program; and the processor, when running the computer program stored in the memory, is caused to perform:

determining a first region in a sample image, wherein the first region is a target region predicted by the target detection model in the sample image, and the sample image comprises one or more of fireworks, dust, clouds, shorelines, flame, smoke, steam, or night light;

counting training periods of the target detection model and determining a relationship between an intersection region and the first region in response to a number of training periods of the target detection model reaching a target number, wherein the intersection region is an intersection of the first region and a second region, wherein the second region is a region annotated for the target in the sample image in a data annotation phase, and surrounds the target in the sample image;

determining, in response to the relationship between the intersection region and the first region satisfying a target relationship, a predetermined low loss function value as a loss function value of the first region, wherein the predetermined low loss function value is a constant and is less than 0.001; and training the target detection model with reference to the loss function value; wherein the target detection model is used to detect one or more of fireworks, dust, clouds, shorelines, flame, smoke, steam, or night light in an image;

wherein determining the relationship between the intersection region and the first region comprises: calculating a ratio of an area of the intersection region to an area of the first region;

the relationship between the intersection region and the first region satisfying the target relationship comprises: the ratio of the area of the intersection region to the area of the first region being not less than a threshold, the threshold ranging from 0.9 to 1; and training the target detection model with reference to the loss function value comprises: updating a parameter of the target detection model with reference to the loss function value that is suppressed, and performing a next period of training.

9. The computer device according to claim 8, wherein the sample image comprises one or more types of targets, and each of the one or more types of targets corresponds to at least one first region; and the processor, when running the computer program stored in the memory, is caused to perform:

performing a weighted summation on loss function values of a plurality of first regions corresponding to the one or more types of targets; and training the model with reference to a loss function value acquired by performing the weighted summation.

10. The computer device according to claim 9, wherein in performing the weighted summation on the loss function values of the plurality of first regions corresponding to the one or more types of targets, a weight of the low loss function value is greater than weights of other loss function values.

11. The computer device according to claim 8, wherein the processor, when running the computer program stored in the memory, is caused to perform:

determining, in response to the relationship between the intersection region and the first region not satisfying the target relationship, the loss function value of the first region using a loss function value calculation formula.

12. A non-transitory computer-readable storage medium, storing a computer instruction therein, wherein the stored computer instruction, when executed by a processor, causes the processor to perform:

determining a first region in a sample image, wherein the first region is a target region predicted by the target detection model in the sample image, and the sample image comprises one or more of fireworks, dust, clouds, shorelines, flame, smoke, steam, or night light;

counting training periods of the target detection model and determining a relationship between an intersection region and the first region in response to a number of training periods of the target detection model reaching a target number, wherein the intersection region is an intersection of the first region and a second region, wherein the second region is a region annotated for the target in the sample image in a data annotation phase, and surrounds the target in the sample image;

determining, in response to the relationship between the intersection region and the first region satisfying a target relationship, a predetermined low loss function value as a loss function value of the first region, wherein the predetermined low loss function value is a constant and is less than 0.001; and training the target detection model with reference to the loss function value; wherein the target detection model is used to detect one or more of fireworks, dust, clouds, shorelines, flame, smoke, steam, or night light in an image;

wherein determining the relationship between the intersection region and the first region comprises: calculating a ratio of an area of the intersection region to an area of the first region;

the relationship between the intersection region and the first region satisfying the target relationship comprises: the ratio of the area of the intersection region to the area of the first region being not less than a threshold, the threshold ranging from 0.9 to 1; and training the target detection model with reference to the loss function value comprises: updating a parameter of the target detection model with reference to the loss function value that is suppressed, and performing a next period of training.

* * * * *